Patented July 27, 1954

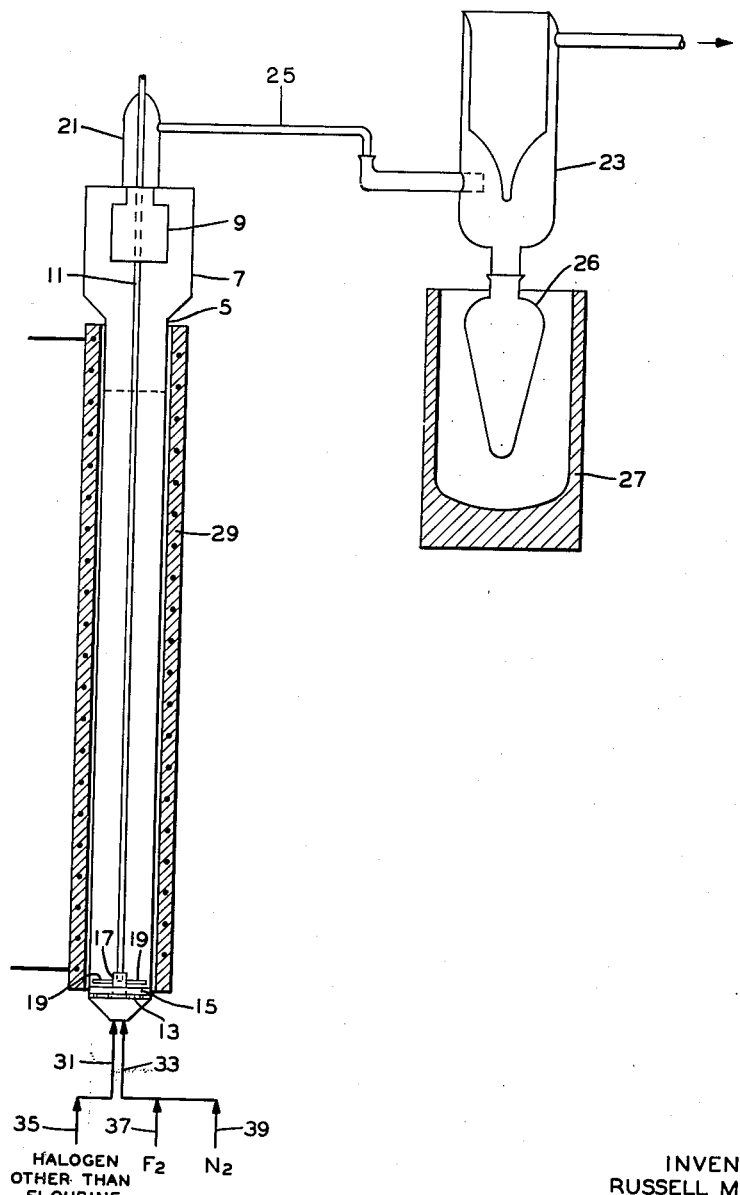

2,684,987

UNITED STATES PATENT OFFICE 2,684,987

METHOD OF PRODUCING HALOCARBONS

Russell M. Mantell, Orange, Herbert J. Passino, Englewood, and Wilber O. Teeters, River Edge, N. J., assignors to The M. W. Kellogg Company, Jersey City, N. J., a corporation of Delaware Application November 19, 1951, Serial No. 257,172

10 Claims. (Cl. 260—653)

This invention relates to an improved process and more particularly pertains to an improved method for producing halocarbons. Still more particularly, the present invention is concerned with an improved process for making halocarbons by means of a fluid system.

It is known that fluorine will react with carbon to produce a mixture of halocarbons of various molecular weights. This reaction ordinarily takes place at a very rapid rate, and it is difficult to control the temperature of the reaction by reason of the large amount of heat which is liberated. The control of temperature is important from the standpoint of protecting equipment parts against extreme corrosion which takes place if the reaction is allowed to proceed without any reasonable control of conditions. Furthermore, lack of control may result in excessive temperatures at which the halocarbons will decompose. The halocarbons which are obtained by the reaction of fluorine and carbon are useful for a variety of purposes, such as for example, those having at least 5 carbon atoms in the molecule can be used as additives in lubricating oils; extraction agents for improving the quality of lubricating oils, etc. The lower boiling halocarbons find use as intermediates in chemical reactions, as refrigerants, dielectric and transformer oils, etc. There is an unlimited number of possible uses for these materials. It is proposed by means of the present invention to provide a process whereby halocarbons can be produced in substantial amounts and in an economical manner.

It is an object of this invention to provide an improved process for manufacturing halocarbons.

Another object of this invention is to provide an improved process for manufacturing halocarbons by means of a fluid system.

Still another object of this invention is to provide an improved process for manufacturing fluorohalocarbons.

A further object of this invention is to provide a method for producing a halocarbon containing fluorine and a halogen other than fluorine, particularly by means of a fluid system.

Other objects and advantages of this invention will become apparent as the description and explanation thereof proceed.

In accordance with the present invention, halocarbons are produced by the method comprising the reaction of fluorine with carbon in the presence of a halogen other than fluorine and under suitable conditions of temperature and pressure.

Another aspect of the present invention is to produce halocarbons by the method comprising the reaction of fluorine with a fluidized mass of finely divided carbon particles in the presence of a halogen other than fluorine and under suitable conditions of temperature and pressure.

The reaction between fluorine and carbon is strongly exothermic, and thus it is difficult to control the reaction, because of the large amount of heat which is liberated. The control of temperature is important, because it affords a means of checking the extreme corrosion of equipment parts, and avoids ultra elevated temperatures at which explosive reaction between carbon and fluorine may occur. It is discovered in the present invention, that the reaction between fluorine and carbon can be conducted with greater facility if there is also present a halogen other than fluorine. This halogen can be chlorine, bromine, iodine or a mixture of two or more of the foregoing. It appears that the halogens other than fluorine act as chain terminators for the complex-free radical carbon-fluorine reactions which usually proceed with explosive rapidity. As a result, however, it was found that the product will contain mixed halocarbons, as well as fluorocarbons. Notwithstanding, the mixed halocarbons produced are useful for the purposes indicated hereinabove with regard to fluorocarbons. For this reaction, generally, the ratio of fluorine to a halogen other than fluorine is about 100 to 1:1, preferably about 10 to 1:1. A useful reactant for this process is chlorine trifluoride.

The carbon employed in the reaction may be used as a lump, granular or finely divided material. Using any kind of system, the reaction proceeds satisfactorily to produce halocarbons of the type described hereinabove. Quite unexpectedly, it was observed that the present process is conducted very effectively by means of a fluid system. In this respect, a mass of finely divided carbon having a particle size in the order of about 5 to about 250 microns, preferably about 10 to about 100 microns, are situated within a suitable reaction vessel and a fluid is passed upwardly therethrough to form a fluid phase. This fluid mass is capable of exerting a fluistatic pressure, flow, etc., in a manner which is similar to a liquid. Ordinarily the reactant gas or gases may be employed for the purpose of fluidizing the mass of finely divided carbon particles. This can be accomplished by passing the reactant gases or any other gaseous material through the mass of finely divided carbon particles at a superficial linear gas velocity of about 0.1 to about 50 feet per second, more usually about 0.1 to about 6 feet per second. However, it is preferred to employ a superficial linear gas velocity in the order of about 1 to about 2.5 feet per second. In the range of velocities given, it is possible to produce either a dense or lean phase of carbon particles. By employing a fluid system, it is possible to control more effectively the temperature of reaction, as well as maintain a more uniform temperature throughout the fluid mass. This phenomenon is apparently due to the random, circulatory motion of the particles in the fluid mass which effects a rapid mixing between the top and bottom of the carbon bed in relatively short periods of time; and the resultant more rapid heat dissipation from the reaction zone to the effluent gases. In such a system, there is a more intimate contact between the reactant gaseous materials and the carbon, thus also resulting in substantially greater yields of halocarbons.

The carbon reactant for the present process should be substantially hydrogen-free, in the sense that it should not contain free hydrogen or compounds which will liberate or release hydrogen under reaction conditions. The presence of hydrogen causes undesirable side reactions which are to be avoided because of the unfavorable influence on product yields, and further, it gives rise to problems of separating the desired products from the total product stream. In this respect, generally, the carbon reactant includes materials in the form of charcoal, such as for example, wood or sugar charcoals; coke; graphite; etc.

In the practice of our invention, it is preferred to employ an excess of carbon reactant over the amount which is theoretically required to react with the gaseous reactant materials. It was found that it is easier to control reaction conditions by maintaining the quantity of fluorine below the stoichiometric quantity which is required to react with the carbon. An excess of fluorine causes rapid reaction rates accompanied by the liberation of an unusual amount of heat which is difficult to control. On the other hand, by maintaining the amount of carbon which is present under reaction conditions in excess of the stoichiometric amount, it was found that the reaction rate can be controlled more readily, and yet substantially all of the fluorine which is fed into the reaction system is consumed. Accordingly, about .001 to about 1.0 cubic feet of fluorine (measured at 60° F. and 760 mm.) per minute per pound of carbon are employed in the present process.

For purposes of fluidization, it is preferred under certain conditions to use an inert gas to supplement the fluidizing effect of passing the reactant gases through a mass of carbon particles. Under some conditions, it may be desirable to employ reactant gas rates which are insufficient to effect fluidization, hence the inert gas is used to insure adequate fluidization of the carbon. The inert gas should be a material which is substantially non-reactive under reaction conditions and preferably also serve as a means for removing excess heat from the reaction zone. In this respect, the inert gas should be a material with a high specific heat in order that small amounts will be sufficient to effect the desired temperature reduction. Generally, the inert gas which can be used includes helium, nitrogen, neon, tetrafluoromethane, etc. The amount of inert gas employed will vary depending upon the needs of a particular situation. However, generally, about 1 to about 1000 cubic feet, preferably about 10 to about 100 cubic feet of inert gas (measured at 60° F. and 760 mm.) per cubic foot of fluorine is employed in the present process.

The temperature of reaction will vary over a wide range depending upon the type of product which is desired. Ordinarily, the temperature is in the order of about 300° to about 1100° F. In the case of reacting a mixture of fluorine and chlorine with carbon, it is preferred to employ a temperature in the range of about 700° to about 1000° F. On the other hand, the reaction between a mixture of fluorine and bromine with carbon is preferably conducted at a temperature of about 900° to about 1200° F. At these temperatures, the reaction can be conducted under sub-atmospheric, atmospheric and super-atmospheric pressures. Ordinarily, the reaction pressure is about 0 to about 100 p. s. i. g., preferably about 5 to about 25 p. s. i. g.

In order to more fully understand the present invention, specific illustrations thereof will be given.

In the drawing, the reactor 5 comprises a vertical, cylindrical, Monel vessel having a diameter of approximately one inch and a length of thirty-six inches. Superimposed on reactor 5 is a settling chamber 7 which has a diameter of four inches and a length of six inches. Within the settling chamber there is situated a cylindrical, porous, sintered, Monel filter 9 which has a length of four inches and a diameter of two inches. The filter serves to remove entrained finely divided solids from the effluent reaction product. For the purpose of temperature indication in the reactor 5, a vertical, cylindrical thermowell 11 is situated within the reactor 5 in concentric fashion, and it has a length of thirty-four inches and a diameter of one-quarter inch. The thermowell contained an iron-constantan thermocouple of thirty-six inches length (not shown). At the inside bottom of reactor 5 there is located a previous Monel plate 13 which serves to support a short Monel tube 15. The Monel tube 15 has a slightly smaller external diameter than the inside of reactor 5, and a length of one inch. The Monel tube 15 was filled with one hundred mesh nickel gauge (not shown). The nickel gauge served to distribute the upflowing gaseous reactants uniformly over the cross-sectional area of the reactor, and also to support the bed of finely divided carbon particles. The Monel plate 13 also served to support a ¼" x 4" Monel sleeve 17. The bottom end of thermowell 11 was inserted into the Monel sleeve 17. The bottom end of thermowell 11 was inserted into the Monel sleeve 17 and thus it was maintained in a concentric position. The Monel sleeve 17 contained projections 19 to keep the sleeve in a concentric position within the reactor 5.

Superimposed on settling chamber 7 is an outlet chamber 21 for filtered reaction product. The outlet chamber is in concentric relation with thermowell 11. Outlet chamber 21 is connected to a Pyrex, internal, cold-finger, liquid nitrogen trap 23 which has a four inch diameter and a length of twenty inches by means of a line 25. The liquid nitrogen trap is connected to a graduated, Pyrex, Podbielniak, distillation kettle 26 of 500 mm. capacity. The kettle is placed in a dewar containing liquid nitrogen.

Heat was supplied externally to the reactor 5 by means of a 2500 watt electric jacket 29 surrounding the same. The reactant materials were charged to the bottom of the reactor 5 by means of lines 31 and 33. The halogen other than fluorine, e. g., chlorine, was charged to the system through line 35, which is connected to line 31 and fluorine and nitrogen were charged to line 33 by means of lines 37 and 39, respectively.

In operation, the pressure of the system was maintained at essentially atmospheric pressure. The finely divided carbon material was first charged to the reactor in the appropriate amount, and after attaining the desired heating through jacket 29, the reactant gases were charged thereto. The rates of reactant materials to the reactor 5 were measured by rotometers, not shown, and the pressure of the reactor 5 by means of a pressure gauge not shown.

Using the laboratory equipment described above, experiments were made with chlorine trifluoride as the reactant gaseous material employing various temperature conditions. These results are reported in Table I below.

the fluorine is still more reactive with carbon than is the other halogen.

Another experiment was conducted in which bromine was employed with fluorine as the reactant gas. This result is reported in Table II below.

*Table II*

| Run No. | Temperature, °F. | Type of Carbon | Carbon gm. | $F_2$ ft.$^3$/min. | $Cl_2$ ft.$^3$/min. | $Br_2$ ft.$^3$/min. | $I_2$ gm. | $N_2$ ft.$^3$/min. | Yields, Wt. Percent (Output Basis) | | | Comments |
|---|---|---|---|---|---|---|---|---|---|---|---|---|
| | | | | | | | | | $CF_4$ | $CF_3Br$ | $C_2F_5Br$ | |
| 1 | 1,000 | Leached Norite [1] | 50 | 0.01 | | 0.005 | | 0.02 | Remainder | 74 | 10 | |
| 2 | 650 | do | 50 | .005 | | | 20 | .02 | Only product | | | |
| 3 | 900 | do | 50 | .0048 | .01 | .004 | | .02 | | | | Variety of chlorofluoro-carbons and bromo compounds. |

[1] 40–60 mesh size.

Upon considering the data given in Table II with that in Table I, it is noted that at essentially comparable operating conditions, the percentage of trifluorobromomethane is substantially higher than the percentage of trifluorochloromethane in the respective products. Furthermore, in this comparison it is shown that the reaction involving bromine is effected with little or no production of high molecular weight halocarbons. This phenomenon serves to indicate the selective nature of bromine with respect to the manufacture of low molecular weight halo-

*Table I*

| Run No. | Temperature,[1] °F. | $ClF_3$ ft.$^3$/min. | Carbon[2] charge, gm. | $N_2$ ft.$^3$/min. | Yields, Grams | | | | | | | | | Compounds having at least 5 carbon atoms |
|---|---|---|---|---|---|---|---|---|---|---|---|---|---|---|
| | | | | | $CF_4$ | $CF_3Cl$ | $CF_2Cl_2$ | $C_2F_6$ | $C_2F_5Cl$ | $C_2F_4Cl_2$ | $C_3F_8$ | $C_3F_7Cl$ | $C_4F_{10}$ | |
| 1 | 775 | .0015 | 50 | .02 | 0.56 | 7.25 | 0.50 | 0.66 | 1.70 | 1.31 | 1.04 | 1.37 | 1.13 | 8.0 |
| 2 | 929 | .0015 | 50 | .02 | 6.87 | 1.23 | 0 | 3.87 | 0.21 | 0 | 4.31 | some | 2.12 | 8.0 |
| 3 | 850 | .0015 | 50 | .02 | 1.44 | 0.57 | 0 | 2.22 | 0.23 | 0 | 3.00 | slight | 1.38 | 7.0 |
| 4 | 850 | .002 | 50 | .02 | 55.7 | 3.13 | 0 | 12.95 | 0.88 | | 8.6 | | 2.12 | 11.5 |

[1] Average temperature across length of bed.
[2] Norite 40–100 mesh.

It is noted from Table I that the products produced are fluorocarbons and fluorochlorocarbons. Also, it is to be noted that the mixed halocarbons contain more fluorine than chlorine. Furthermore, the mixed halocarbons containing more than one atom of chlorine in the product are less than those containing one atom of chlorine for the same number of carbon atoms in the compound. The presence of a halogen other than fluorine in the reaction mass may slow down the reaction between carbon and fluorine, however, carbons.

As a result of the findings with a halogen other than fluorine in the reaction of fluorine and carbon, additional experiments were made for the purpose of determining what effect other materials would have on the same reaction. One purpose for these experiments was to evaluate some materials as fluidizing media to supplement the reactant gas. These results are reported below in Table III.

*Table III*

| Ex. No. | Temp., °F. | Carbon, gm. | $F_2$ ft.$^3$/min. | $N_2$ ft.$^3$/min. | Auxiliary material | Auxiliary material ft.$^3$/min. | Auxiliary material gm. | Comments |
|---|---|---|---|---|---|---|---|---|
| 1 | 900 | 50 | .0048 | 0.02 | CO | 0.001 | | $COF_2$ formed in large amounts. |
| 2 | 600 | 50 | .0025 | 0.02 | $CO_2$ | 0.0025 | | Mixture of $CO_2$ and some $COF_2$. |
| 3 | 700 | 50 | 0.005 | 0.02 | $SO_2$ | .001 | | 95% yield of gas having 95 mol Wt. and 4% high boilers.[1] |
| 4 | 900 | 50 | 0.005 | 0.02 | $SO_2$ | .001 | | Gas of 95 mol Wt. and some H. B. |
| 5 | 650–900 | 50 | 0.005 | 0.02 | NOCl | .001 | | 25% high boilers and 75% gas of 95 mol Wt. |
| 6 | 900 | 50 | 0.005 | 0.02 | $N_2O$ | .0025 | | Trace of high boilers and gas of 78.5 mol Wt. |
| 7 | 600 | 50 | 0.005 | 0.02 | $N_2O$ | .0025 | | Trace of high boilers and gas of 60 mol Wt. |
| 8 | 900 | 50 | 0.005 | 0.02 | SiC | | 150 | Large amount of $CF_4$ and small amount of H. B. |
| 9 | 700 | 50 | 0.005 | 0.02 | SiC | | 150 | Do. |
| 10 | 900–1,200 | 50 | 0.005 | 0.02 | KI | | 161 | Only $CF_4$ produced. |
| 11 | 700 | 50 | 0.005 | 0.02 | $SO_3$ | .001 | | $SO_3$ reduced to $SO_2$. |

[1] High boilers are liquid halocarbons.

A choice of a halogen other than fluorine will depend on the type of product sought. If CF₄ is wanted, iodine should be used. For a mixed halocarbon, i. e., a substituted methane compound, bromine is by far the most desirable halogen to use with fluorine. Chlorine should be used for the production of higher molecular weight compounds. The product will contain a variety of fluoro- and fluorochlorocarbons of various molecular weights.

From the above data, it is apparent that a halogen other than fluorine serves to control or moderate the reaction of fluorine with carbon. However, it should be noted that bromine, under comparable operating conditions, appears to exert a selective production of low molecular weight halocarbons, principally the bromotrifluoromethanes as compared to the use of chlorine. In this respect, therefore, bromine is unexpectedly more effective for the production of low molecular weight halocarbons over chlorine.

Having thus described our invention by furnishing specific examples, it is to be understood that no undue restrictions and limitations are to be imposed by reason thereof.

We claim:

1. A process for preparing halocarbons which comprises reacting fluorine and carbon in a reaction zone to which zone there is charged a halogen other than fluorine such that the relative amounts of fluorine and a halogen other than fluorine charged to the reaction zone are about 1 to about 100 parts of fluorine per part of halogen other than fluorine.

2. A process for preparing halocarbons which comprises reacting fluorine with a fluidized mass of finely divided carbon particles in a reaction zone to which zone there is charged a halogen other than fluorine such that the relative amounts of fluorine and halogen other than fluorine charged to the reaction zone are about 1 to about 100 parts of fluorine per part of halogen other than fluorine.

3. A process for preparing halocarbons which comprises reacting fluorine with a mass of finely divided carbon particles suspended in an inert gas in a reaction zone to which zone there is charged a halogen other than fluorine such that the relative amounts of fluorine and halogen other than fluorine charged to the reaction zone are about 1 to 100 parts of fluorine per part of halogen other than fluorine.

4. The process of claim 1 wherein the halogen other than fluorine is chlorine.

5. The process of claim 1 wherein the halogen other than fluorine is bromine.

6. A process for preparing bromotrifluoromethane which comprises reacting fluorine and carbon in a reaction zone to which zone there is charged bromine in an amount such that the relative quantities of fluorine and bromine charged to the reaction zone are about 1 to about 100 parts of fluorine per part of bromine.

7. A process for preparing halocarbons which comprises reacting fluorine with a fluidized mass of finely divided carbon particles in a reaction zone, and charging chlorine to the reaction zone in an amount such that the relative quantities of fluorine and chlorine charged to the reaction zone are about 1 to about 100 parts of fluorine per part of chlorine.

8. The process of claim 2 wherein the halogen other than fluorine is bromine.

9. The process of claim 3 wherein the halogen other than fluorine is chlorine.

10. The process of claim 3 wherein the halogen other than fluorine is bromine.

References Cited in the file of this patent

UNITED STATES PATENTS

| Number | Name | Date |
|---|---|---|
| 2,456,027 | Simons | Dec. 14, 1948 |

OTHER REFERENCES

Simons et al., J. A. C. S., 61, pages 2962–66 (1939).

McBee et al., Oil and Gas J., 46, page 59 (1947).